(12) United States Patent
Klemer et al.

(10) Patent No.: US 8,102,412 B2
(45) Date of Patent: Jan. 24, 2012

(54) CALIBRATING A BI-DIRECTIONALLY SCANNING ELECTROPHOTOGRAPHIC DEVICE

(75) Inventors: Daniel R. Klemer, Lexington, KY (US); David J. Mickan, Lexington, KY (US); Eric W. Westerfield, Versailles, KY (US)

(73) Assignee: Lexmark International, Inc, Lexington, KY (US)

( * ) Notice: Subject to any disclaimer, the term of this patent is extended or adjusted under 35 U.S.C. 154(b) by 1485 days.

(21) Appl. No.: 11/511,717

(22) Filed: Aug. 29, 2006

(65) Prior Publication Data

US 2008/0055388 A1 Mar. 6, 2008

(51) Int. Cl.
*B41J 2/435* (2006.01)
(52) U.S. Cl. .......................... 347/248; 347/235; 347/250
(58) Field of Classification Search .................. 347/233, 347/248, 235, 250; 399/72
See application file for complete search history.

(56) References Cited

U.S. PATENT DOCUMENTS

| | | | | |
|---|---|---|---|---|
| 5,530,460 A | * | 6/1996 | Wehl | 347/19 |
| 5,748,330 A | * | 5/1998 | Wang et al. | 358/3.21 |
| 6,089,766 A | * | 7/2000 | Yamada et al. | 400/120.09 |
| 6,560,410 B2 | * | 5/2003 | Ichikawa et al. | 396/2 |
| 6,650,864 B2 | * | 11/2003 | Miyamoto et al. | 399/384 |
| 7,889,223 B2 | * | 2/2011 | Klement et al. | 347/248 |
| 2004/0119002 A1 | | 6/2004 | Bush et al. | |
| 2004/0119811 A1 | | 6/2004 | Bush et al. | |
| 2004/0119813 A1 | * | 6/2004 | Bush et al. | 347/259 |
| 2004/0125198 A1 | | 7/2004 | Klement | |
| 2006/0064019 A1 | | 3/2006 | Bush et al. | |
| 2006/0114309 A1 | | 6/2006 | Bush | |

* cited by examiner

*Primary Examiner* — Stephen Meier
*Assistant Examiner* — Sarah Al Hashimi

(57) ABSTRACT

Methods and apparatus include aligning printing of a bi-directionally scanning electrophotographic (EP) device, such as a laser printer or copy machine. At least first and second scan lines formed in opposite directions define a calibration page for manufacturing, servicing or end-user operation. The page includes pluralities of objects with one formed from either the first or second scan lines, but not both, and another of the objects formed from the other of the first or second scan lines, but not both. In this manner, corrections can be implemented by simply observing misalignments between the objects. Printed calibration pages also include visually or mechanically read objects for implementing corrections. In this regard, calibrating devices external to the EP device are contemplated. Objects include lines, squares or other shapes and their arrangement on a page varies. Fiducials for macro-scale observations are also contemplated.

16 Claims, 15 Drawing Sheets

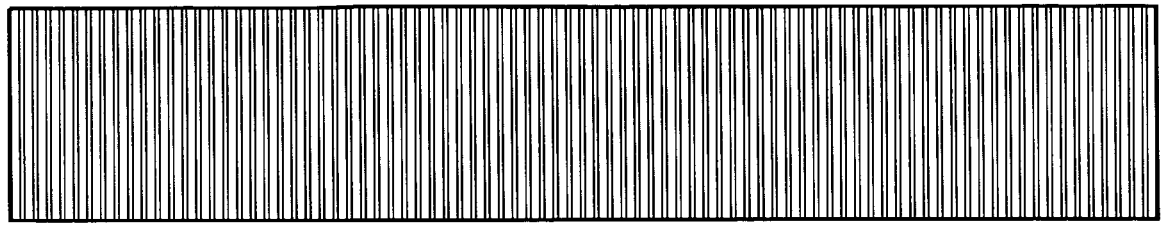
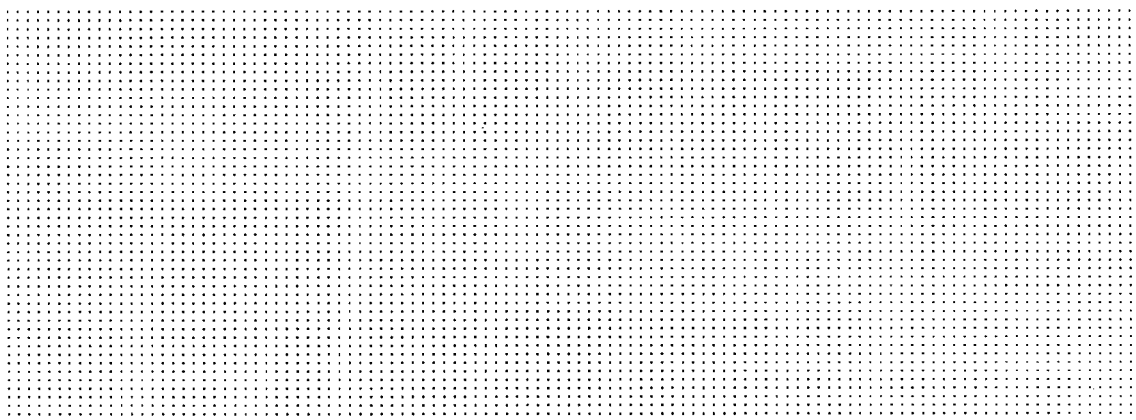
Fig. 15
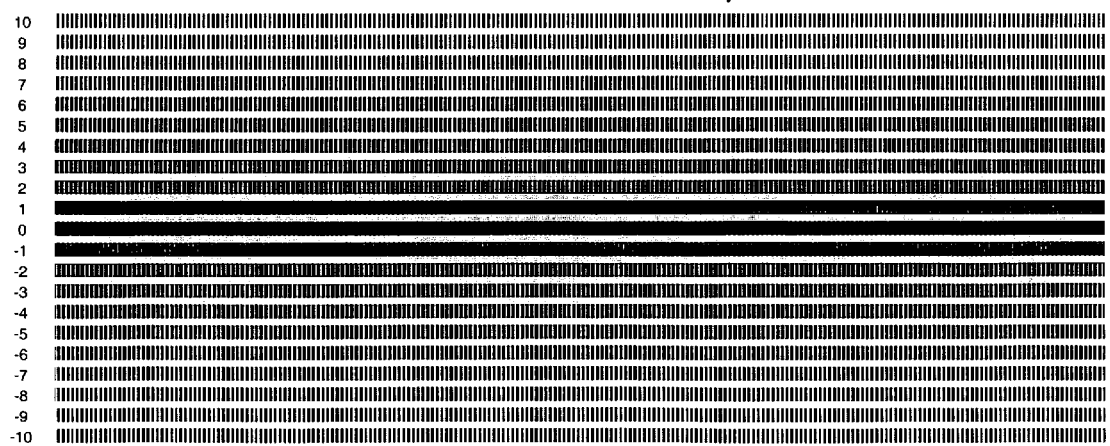

Bi-directional print misalignment as a function of horizontal position.

CALIBRATING A BI-DIRECTIONALLY SCANNING ELECTROPHOTOGRAPHIC DEVICE

FIELD OF THE INVENTION

Generally, the present invention relates to electrophotographic devices, such as laser printers or copy machines. Particularly, it relates to improving print quality in electrophotographic (EP) devices utilizing bidirectional scanning. In one aspect, print calibration pages are prepared for manufacturing, servicing or end-user operations. In another, calibration pages include predetermined patterns for scanning to correct misaligned EP devices. Still other aspects relate to characterizing scanners or other image acquisition devices before correcting the EP device.

BACKGROUND OF THE INVENTION

Traditional electrophotographic (EP) devices have a spinning polygon mirror that directs a laser beam to a photoconductor, such as a drum, to create one or more scan lines of a latent to-be-printed image. Recently, however, it has been suggested that torsion oscillator or resonant galvanometer structures can replace the traditional spinning polygon mirror to create scan lines in both the forward and reverse directions (e.g., bi-directionally) and increase efficiency of the EP device. Because of their MEMS scale size and fabrication techniques, the structures are also fairly suggested to reduce the relative cost of manufacturing. Unfortunately, scanning in two directions adds a measure of complexity to image referencing since reference points need occur for each of the forward and reverse scans at opposite ends of the printed page and the slightest of deviations amplifies print image imperfections. Also, EP device parameters, such as beam sensor signal delays, optical component alignment, and galvanometer or oscillator scan profile nonlinearity must be measured and accounted for.

Accordingly, there exists a need in the art for calibration techniques for bi-directionally scanning EP devices. Particularly, there are needs by which the print alignment is accounted for at one or more of the stages of manufacturing, servicing or end-user operation. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter-described calibration for bi-directionally scanning electrophotographic (EP) devices, such as laser printers or copier machines. In its most basic sense, an EP device scans multiple scan lines in alternating directions to form a latent calibration image. A printed calibration image developed from the latent image is observed to determine whether misalignments exist, and to establish the type and magnitude of such misalignments. Corrections are then implemented so that future scan lines of future latent images produce better print quality.

Representatively, multiple instances of forward and reverse scan lines formed in opposite directions define a calibration page for manufacturing, servicing or end-user operation. The page includes pluralities of objects with at least one formed from either the forward or reverse scan lines, but not both, and at least another formed from the other of the forward or reverse scan lines, but not both. In this manner, corrections can be implemented by simply observing misalignments between the objects.

Objects include, but are not limited to, lines, squares or other shapes and their arrangement on a page varies. They may also be bounded or not. Fiducials for macro scale correction, before micro scale correction of the objects, are further contemplated.

Printed calibration pages are visually or mechanically read to ascertain the misalignment of the objects for implementing corrections. In this regard, devices external to the EP device, such as integrated or remote scanners or cameras, are calibrated to ascertain their inherent errors before being used to read the calibration page. Techniques include observing multiple instances of data from test pages or using ideal samples relative to actual samples. Errors in scanning from operator-induced skew are also accounted for.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 15 is a diagrammatic view in accordance with the present invention of an actual composite calibration test image for scanning to correct alignment in a bi-directionally scanning EP device.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, calibrating a bi-directionally scanning electrophotographic (EP) device is hereafter described.

Figure 1:
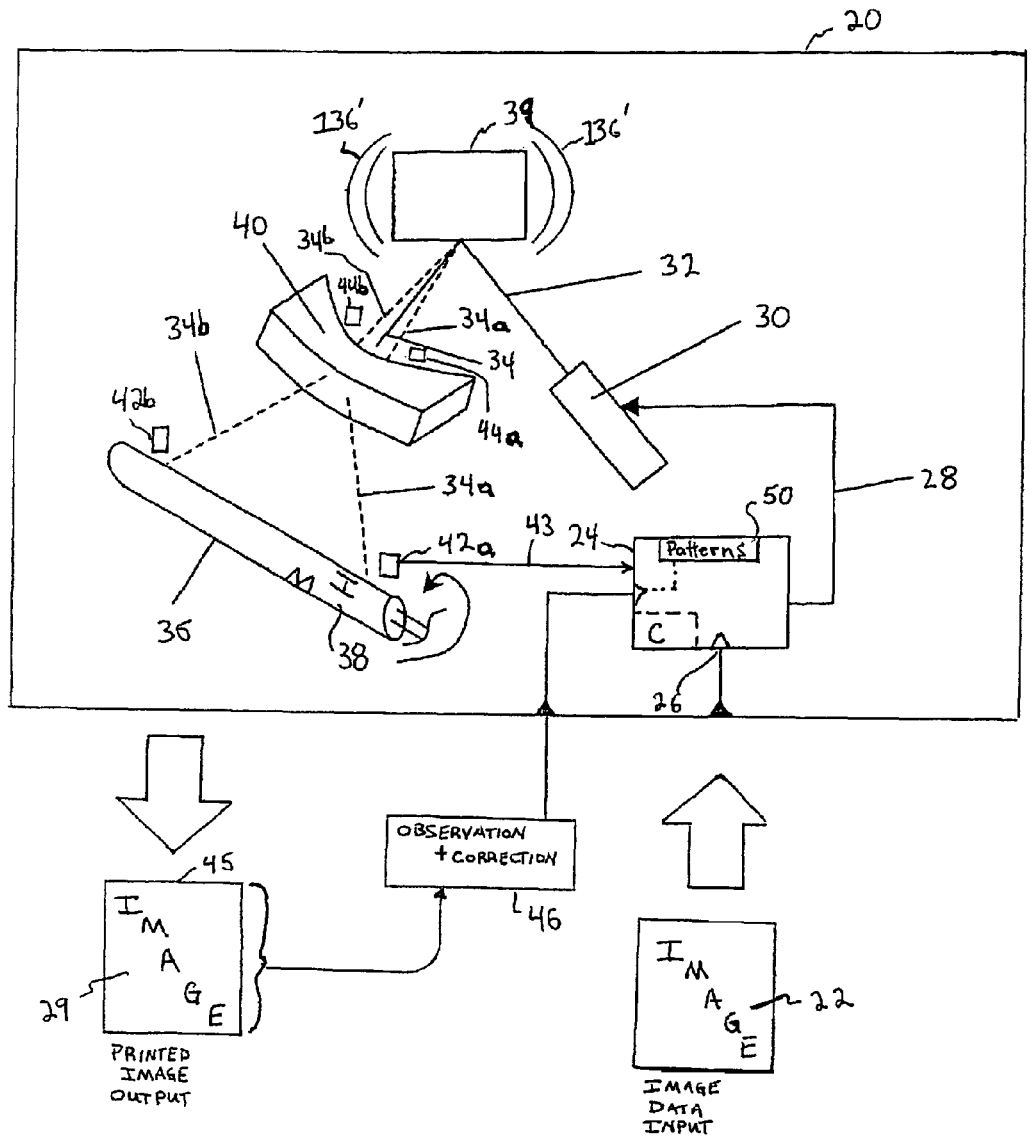
FIG. 1 is a diagrammatic view in accordance with the present invention of a representative bi-directionally scanning EP device.

With reference to FIG. 1, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output, video signal 28 to produce a latent image of the image data. Ultimately, a hard-copy printed image 29 of the image data is obtained from the latent image. If print alignment and operating conditions of the EP device are well calibrated, the printed image 29 corresponds nearly exactly with the image data input 22. If not, the printed image has poor quality, especially in the form of a variety of misalignments.

With more specificity, the output, video signal 28 energizes a laser 30 to produce a beam 32 directed at a scanning mechanism 39, such as a torsion oscillator or resonant galvanometer. As the oscillator or galvanometer moves (indicated by oscillation wave lines 136') the beam 32 is reflectively cast to create beam lines 34a, 34b on either side of a central position 34. As a result, multiple scan lines in alternate directions are formed on a photoconductor 36, such as a drum, and together represent a latent image 38 of the image data supplied to the controller. Optically, certain lenses, mirrors or other structures 40 exist intermediate to the photoconductor to transform the rotational scan of the laser beam reflected from the oscillator or galvanometer 34 into a substantially linear scan of the beam at the photoconductor 36, with substantially uniform linear scan velocity and with substantially uniform laser beam spot size along the imaging area of the drum. To provide common reference for the beam lines, various sensors are employed. Preferably, a forward horizontal synchronization (hsync) sensor 42a and a reverse hsync sensor 42b are positioned near opposite ends of the photoconductor to provide a common reference for all forward scanning beam lines and all reverse scanning beam lines, respectively. In addition to, or in lieu of the sensors 42a, 42b, forward and reverse hsync sensors may be positioned at 44a and 44b, upstream of the representative optics 40. Alternatively still, a single hsync sensor might be used with one or more mirrors emplaced variously to act as a second hsync sensor. Regardless, the outputs of these sensors (representatively given as line 43 from hsync sensor 42a) are supplied to the controller 24 for referencing correct locations of the scan line(s) of the latent images. Downstream of the latent image, the printed image is formed by applying toner to the latent image and transferring it to a media, such as a sheet of paper. Thereafter, the media 45 with the printed image 29 exits the EP device, where users handle it for a variety of reasons.

Unfortunately, the printed image 29 is not always an accurate representation of the image data input 22 and various operations are hereafter described to calibrate the EP device. Especially, the printed image 29 is observed in some fashion and a correction implemented so that future scan lines of future latent images are altered to make the printed image appear as close to the image data input as possible. In essence, the observation and correction is a feedback loop, of sorts. As shown, the image is observed at 46 and a correction indicated to the EP device 20. In one instance, this corresponds to an end-user making a visual observation of the printed image and informing the EP device, such as by way of a user interface of an attendant computer (not shown) or an operator panel directly on the EP device, of a preferred correction. In another, a reading of the printed image occurs and an automated selection or value or set of selections or values is made and conveyed to the EP device. Once conveyed to the EP device, the selection or value or set of selections or values so conveyed are stored in nonvolatile random access memory (NVRAM) within the EP device so that they may be later recalled to implement the preferred correction. Reading, as is well known, can occur by way of optical flatbed or sheet-fed scanners, cameras, or other devices. In still other instances, the observation and correction occurs internal to the EP device such as by observing a printed image still in the EP device or by observing the latent image 38 on the photoconductor. Corrections C then occur by way of selection or analysis in the controller 24.

Also, observation and correction can occur relative to a specially made calibration page or image that manufacturers, service technicians or end-user operators employ as part of aligning print. To this end, the remaining discussion representatively focuses on a printed image output 29 on a media 45 in the form of a calibration page initiated not from externally supplied image data 22, but a variety of diagnostic patterns 50 from internal to the controller 24 or an attendant device that normally supplies the image data 22. That is, the controller and/or attendant device supply or define predetermined patterns to create a calibration page of the type later described regarding FIG. 15, for example. The calibration page is then observed and the results of an analysis of those observations are fed as an input to the EP device to align print of the EP device. The calibration page, however, is not typically thought of as image data in the sense that end-users want to regularly print this output.

Figure 2:
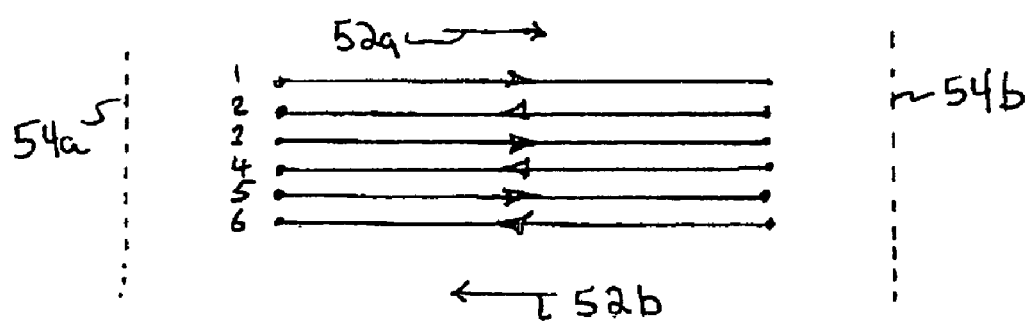
FIG. 2 is a diagrammatic view in accordance with the present invention of desirable scan lines and reference positions in a bi-directionally scanning EP device.

Before then, however, FIG. 2 conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) occurring in a reverse scan direction 52b. Also, the forward and reverse scan lines alternate with one another and such is the nature of scanning with the torsion oscillator or resonant galvanometer and its attendant formation of forward-scanning beam lines 34a and reverse-scanning beam lines 34b. Also, the reference position 54a supplies a common reference point for each of the forward scanning lines and is borne about by the signal from the forward hsync sensor. Conversely, the reference position 54b supplies a common reference point for each of the backward scanning lines and is borne about by the signal from the reverse hsync sensor.

Hereafter, known patterns of a calibration page are defined such that after they become printed and scanned, the location of features in the pattern can be compared to the intended locations of those features to determine the associated pixel (pel) placement error. For instance, if a given pixel of a calibration page was expected to be printed at some given point in a coordinate scheme, such as (x0, y0), but was actually printed at a point with coordinates (x1, y1), the amount of placement error for the pel is readily determined by finding the difference between the actual and expected points, such as (x1-x0, y1-y0). Armed with this knowledge, a correction scheme can be implemented such that a next iteration of a printed page actually places the pixel at the proper location. Since the process is more complex than this, the actual features of a calibration page are defined such that, using standard image processing techniques, they can be identified and accurately located quickly, efficiently and reliably. Furthermore, the pattern of features is defined such that it enables accurate measurement of scan linearity and alignment errors with relatively high immunity to image defects, such as stray marks, regions of light or missing printing, dark background, low contrast, print skew, print shift, scanned image skew, scanned image shift, print scaling, scanned image scaling, scanned image nonlinearity, etc. Also, the patterns representatively typify bitmap images, postscript files, or any of a number of various image or document formats that can be processed by the EP device to create the required features or objects on the printed media.

Moreover, the printing of features or objects are controlled such that a first feature is formed with pels located only on forward scan lines and a second feature formed with pels located only on reverse scan lines. In this manner, measuring the difference in location between the forward-printed features and the reverse-printed features and comparing the measured difference with the expected difference can determine the error in forward-to-reverse scan line alignment. This error measurement can then be used to compute an appropriate calibration factor or factors that control the amount of correction applied during normal EP activities.

As a representative example, a bitmap image is formed such that each pixel in the bitmap corresponds to one specific printed pel in the printed image output when the image is printed by the EP device, and forward-printed objects or features are composed of only pels located on lines that correspond to forward scan lines, while reverse-printed objects or features are composed of only pels located on reverse scan lines. As another example, a postscript file that defines the alignment features may include the following set of lines:

```
<</HalftoneType 3 /Width 1 /Height 2 /TransferFunction { } /Thresholds
 <
ff
00
>
>> sethalftone
```

```
0.5 setgray
% Even scan line feature definitions
...
<</HalftoneType 3 /Width 1 /Height 2 /TransferFunction { } /Thresholds
 <
00
ff
>
>> sethalftone
0.5 setgray
% Odd scan line feature definitions
...
```

Figure 3:
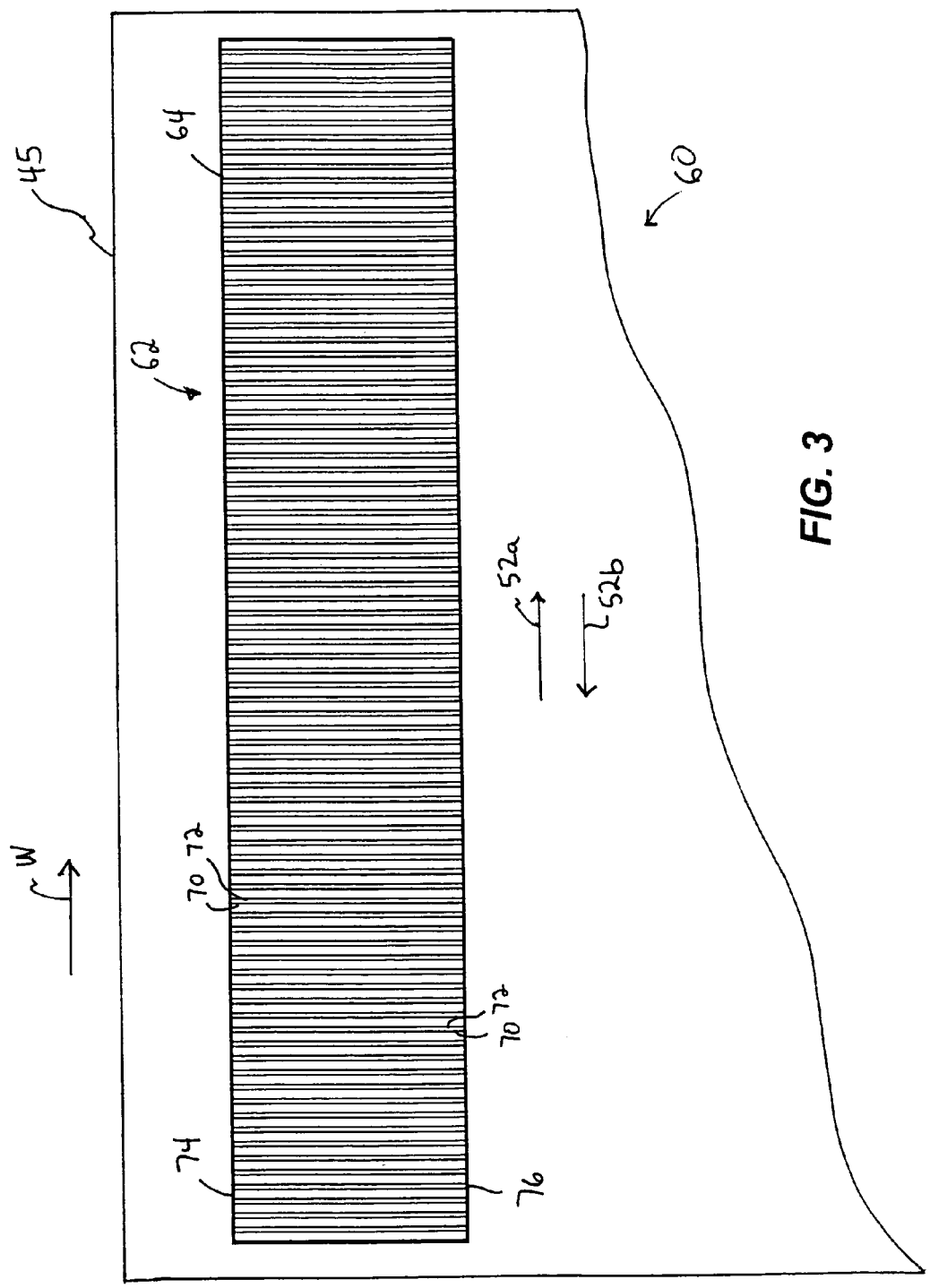
FIG. 3 is a diagrammatic view in accordance with the present invention of a representative printed pattern of a bi-directionally scanning EP device for calibrating and implementing an alignment correction.

With reference to FIG. 3, a representative calibration page includes a test image with one or more features or objects, such as lines, line pairs, squares, square pairs, circles, text, images, other shapes, or the like that readily lend themselves to standard image processing techniques. Namely, the calibration page 60 exists as a media 45 with a test image 62. A boundary 64 forms a substantial rectangle shape for containing a plurality of line pairs 70 and 72. Because of space constraints, only a few are labeled but they typically number about 75 to 100 pairs across a width W of the media 45. They also extend substantially vertically from one end 74 of the boundary to another 76 and are separated by a predetermined amount that will be later useful in determining calibration.

Figures 4A, 4B:
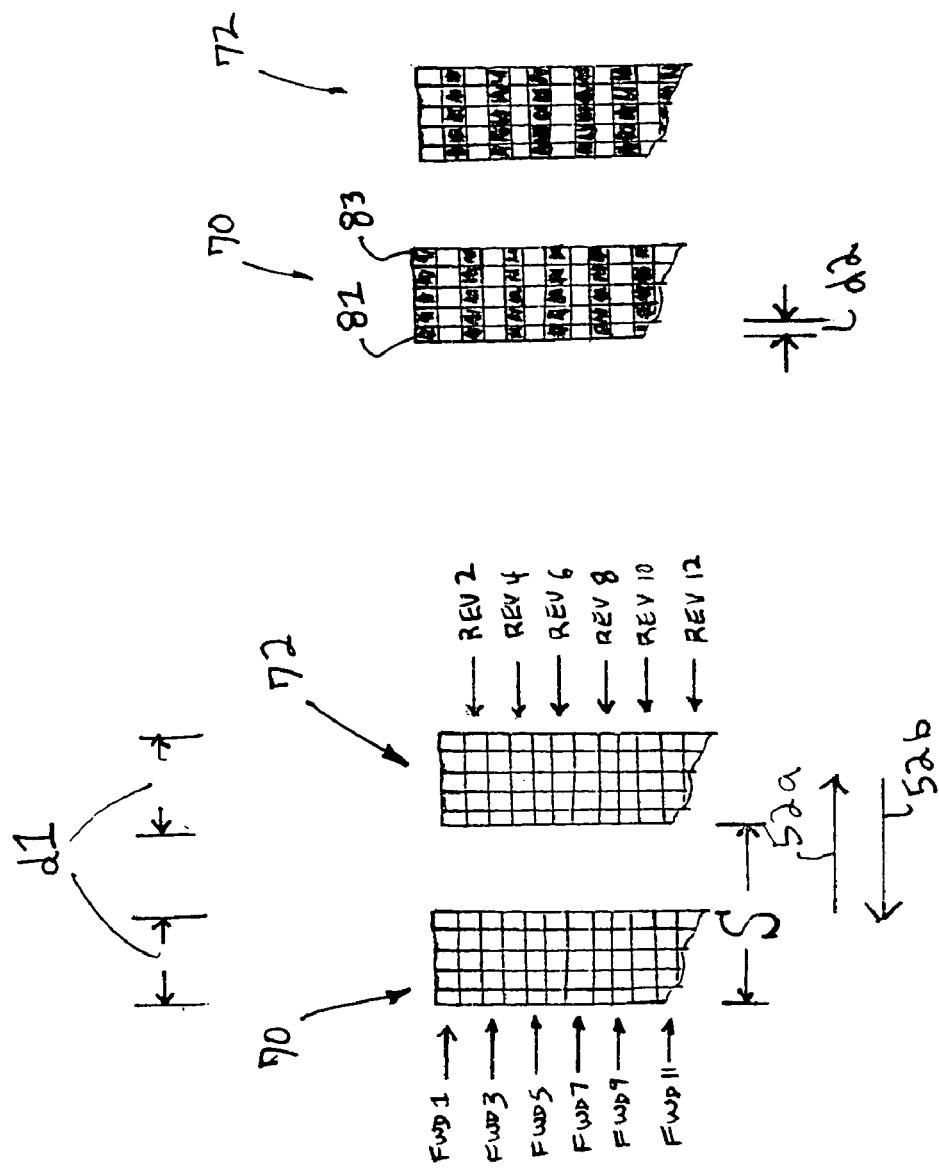
FIGS. 4A and 4B are diagrammatic views in accordance with the present invention of a detailed portion of the printed pattern of FIG. 3 showing creation of the pattern with alternating scan lines in a bi-directionally scanning EP device.

With combined reference to FIGS. 3, 4A and 4B, each line pair has a separation distance S of about twenty pixels (pels), at an EP device resolution of about 600 dots per inch (dpi). Each individual line 70 or 72 is also about four to eight pels wide, distance d1. (Of course, these are representative amounts and any number is embraced herein.) To form the lines (or objects), a first one is formed only by the forward or reverse scan lines, but not both, while the other is formed only by the opposite of the forward of reverse scan lines, but not both. As shown, line 70 is formed completely by scan lines 1, 3, 5, 7, 9, 11, etc., in the forward scan direction while line 72 is formed by scan lines 2, 4, 6, 8, 10, 12 etc., in the reverse scan direction. In FIG. 4B, an ideal latent image is then given per each pixel of the lines. In practice, however, the laser spot on the photoconductor would be slightly larger than a given pixel and would spill outside the pixel boundaries such that the lines would appear to the human eye on a printed image as a completely solid vertical line 70 or 72 as in FIG. 3. (This will also be described in more detail in FIG. 8.)

Figure 5:
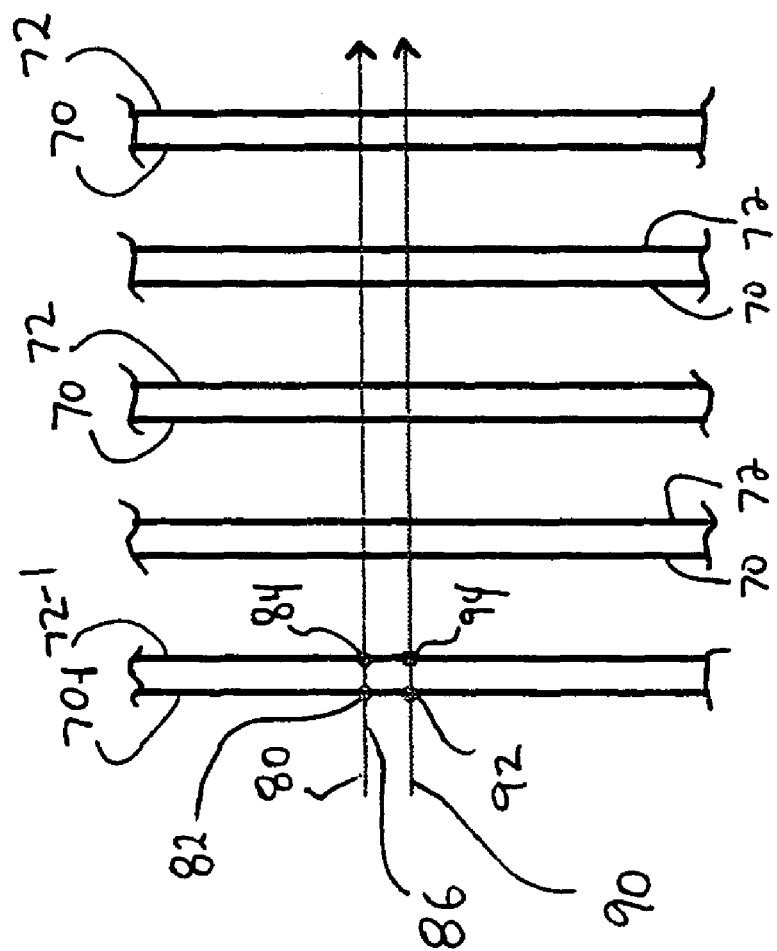
FIG. 5 is a diagrammatic view in accordance with the present invention of a detailed portion of the printed pattern of FIG. 3 showing obtaining data for calibration.

Once formed, the media 45 with test image 62 is scanned, such as on a flatbed scanner at the same resolution as the EP device (e.g., 600 dpi). The scanned image is analyzed using, for example, appropriate image analysis software to determine offsets from anticipated placement of pels. With reference to FIG. 5, a vertical location in the scanned image at which the pattern is certain to be present is analyzed. In this regard, a computer-realized horizontal row 80 of pixel data is analyzed to determine the position at which each line 70, 72 intersects the row (e.g., at positions 82 or 84). While this can be accomplished in a variety of ways, one way is to step through all pixels in the row 80 (in the direction of the arrow) and to determine a start and an end pixel for each line, where the start pixel for a line is the first pixel associated with the line for which the darkness is above a specified threshold, and the end pixel is the last pixel associated with the line for which the darkness is above the specified threshold, with darkness defined as (255-v), where v is the grayscale intensity of the pixel, with 0 indicating a totally black pixel and 255 indicating a totally white pixel. The location of a line can then be determined as the midpoint between the locations of the start and end pixels for the line.

For example, at position 86 in row 80, the pixel is white, but at position 82 the pixel is black. By applying the above process for all pixels in row 80, it is then determined that the line 70 crosses row 80 at position 82 and that line 72 crosses row 80 at position 84. Similarly, computer-realized horizontal row 90 shows intersection of the line pairs at positions 92 and 94. Once the intersections of the lines are known, an actual separation distance (e.g., S, FIG. 4A) between the lines of the line pairs can be determined and compared to the expected separation distance to determine a correction that can be implemented to fix misalignment.

To achieve a better measure of line location, it is the actual situation that centroids of the lines are determined according to the equation:

$$x_c = \frac{\sum_{i=s-1}^{e+1} x_i \cdot d_i}{\sum_{i=s-1}^{e+1} d_i}$$

where $x_c$ is the horizontal location of the centroid of one line, s is the index of the start pixel (e.g., 81, FIG. 4B) and e is the index of the end pixel for the line (e.g., 83, FIG. 4B), $x_i$ is the horizontal location of pixel i, and $d_i$ is the darkness of pixel i. The process is repeated for each adjacent line along the row (e.g., start with line 70-1 then progress to line 72-1) until the locations have been determined for all lines 70 and 72 of line pairs in one row, e.g., 80. To achieve a more accurate measurement of line location, the location for each individual line 70 or 72 is calculated over many horizontal rows, e.g., 80, 90, etc., and the results averaged.

Figure 16:
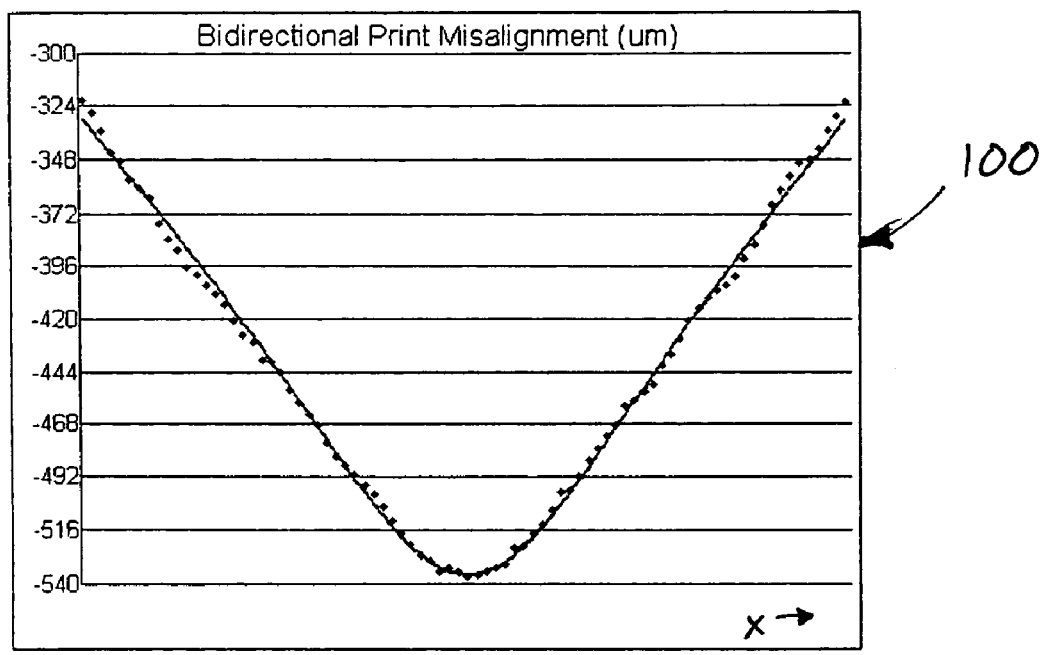
FIG. 16 is a graph in accordance with the present invention of a representative error plot.

After the average positions have been determined for all lines in the image, a forward-to-reverse alignment error is computed for each line pair as follows: $e_i = x_{i+1} - x_i - n \cdot w_p$; where $e_i$ is the forward-to-reverse misalignment error for the pair consisting of lines i and i+1 (e.g., 70-1 and 70-2), n is the expected separation between lines i and i+1 in units of pels (e.g., 20 pels), and $w_p$ is the width of one printed pel (e.g., distance d2, FIG. 4B). In FIG. 16, the error is then shown as a graph 100 as a function of position within the calibration page (in the x direction corresponding to the width direction of the calibration page). Also, the graph 100 includes a least-squares fit of the function:

$$e(x) = \left( \frac{2^{0.06x} - 1}{2^{0.06x} + 1} \cdot m \cdot x + b \right)$$

to actually measured data of separation distances between line pairs (e.g., S, FIG. 4A). Further, the fit parameters m and b define two calibration factors that are used by a correction algorithm to adjust the location of each pel in a printed image output (e.g., 29, FIG. 1) such that the misalignment errors appear corrected in normal printed output. In other words, so the printed image output closely resembles the image data input.

Figure 6:
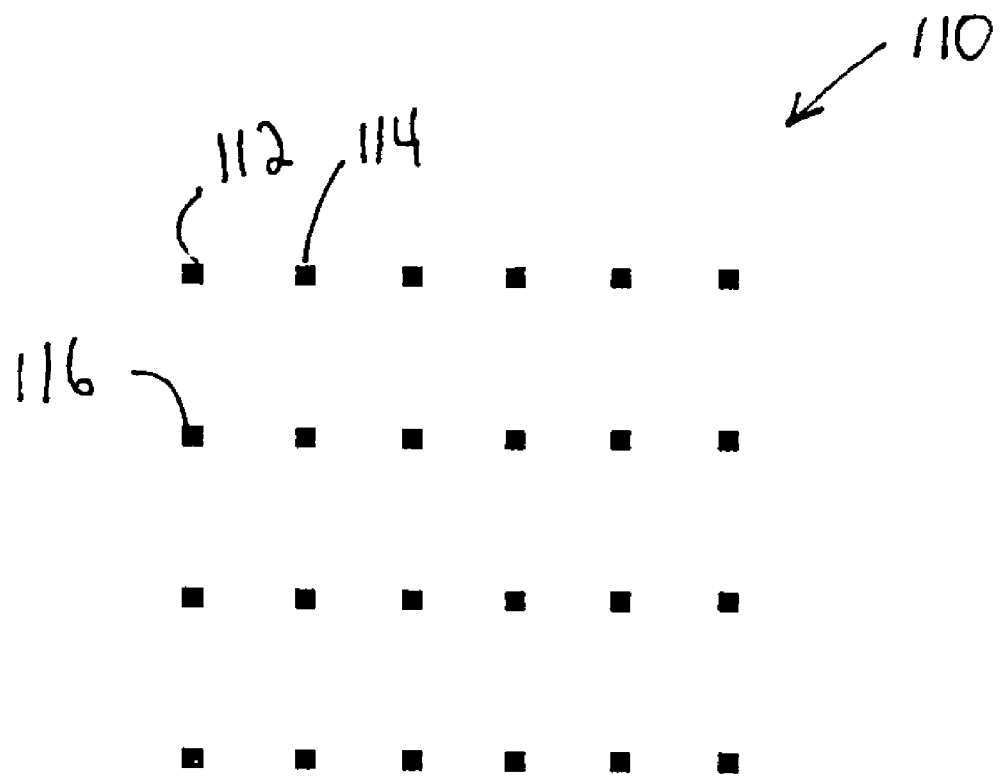
FIG. 6 is a diagrammatic view in accordance with the present invention of an alternate embodiment of a representative printed pattern of a bi-directionally scanning EP device for calibrating and implementing alignment correction.
Figure 7:
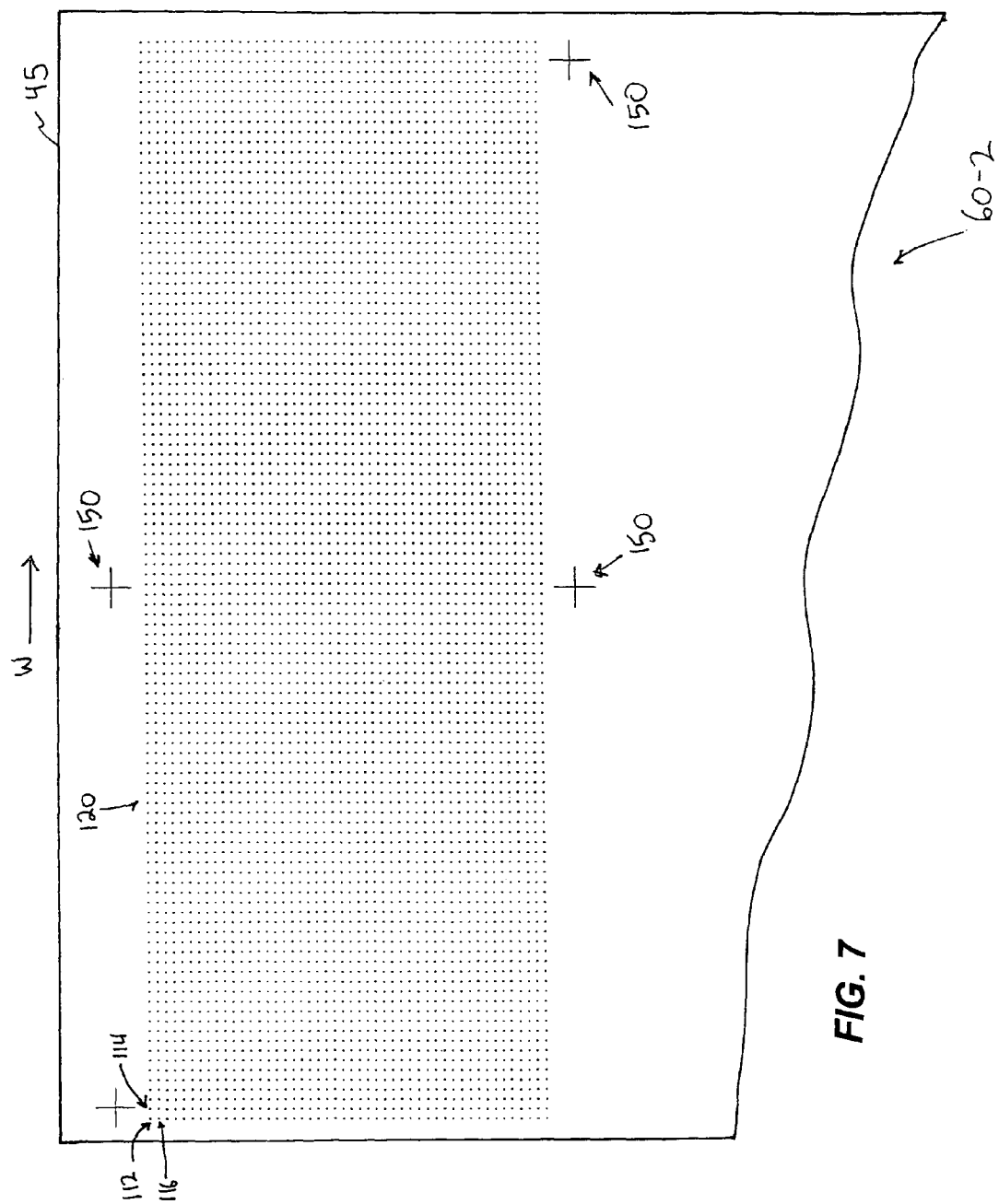
FIG. 7 is a diagrammatic view in accordance with the present invention of a larger representation of the printed pattern of FIG. 6.
Figure 8:
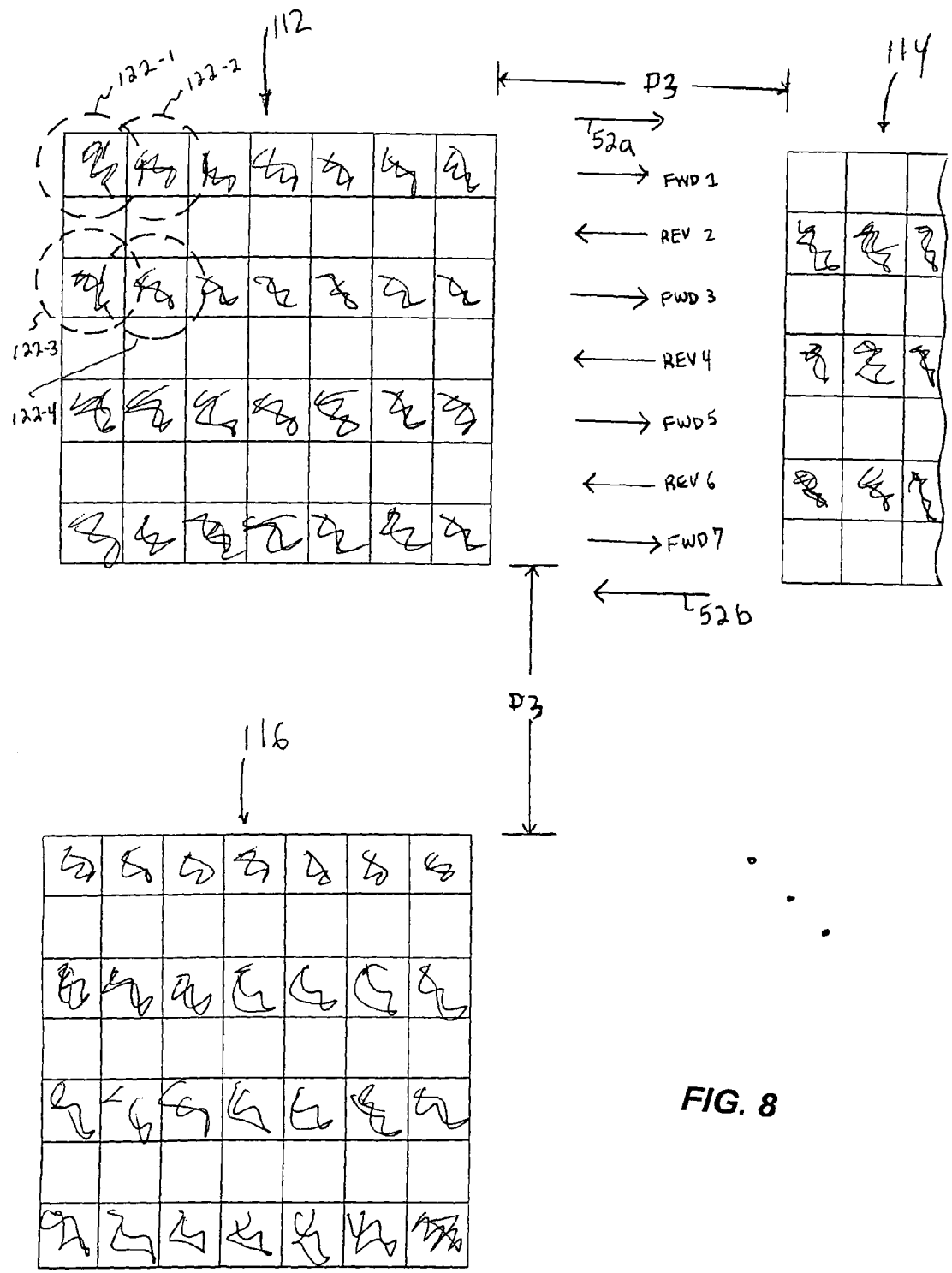
FIG. 8 is a diagrammatic view in accordance with the present invention of a detailed portion of the printed pattern of FIG. 6 showing creation of the pattern with alternating scan lines in a bi-directionally scanning EP device.

With reference to FIGS. 6-8, an alternate test image 110 for a calibration page 60-2 is given as 110. The objects or features of the image typify squares 112, 114 and 116, for example, and the figures show them according to various scales. In FIG. 7, they collectively also form a generally rectangular grid 120 across a substantial width w of a media 45. In FIG. 8, each object is formed as either a forward only scan line or a reverse only scan line so that misalignments between the objects can be observed and overall corrections implemented for the EP device. As is seen, scan lines 1, 3, 5 and 7 in the forward scan direction 52a form object 112. Object 114, on the other hand, is formed by scan lines 2, 4, and 6 in the reverse scan direction 52b and both typify a square of 7 pixels by 7 pixels. (Object 116 is similar to object 112 in its formation.) Also, actual writing of a scan line in the forward scan direction causes laser beam spots 122-1, 122-2, 122-3 and 122-4 on a photoconductor (e.g., 36, FIG. 1) to be larger than its attendant pixel thereby making the object appear as a solid 7 pixel by 7 pixel square. In a similar manner, objects 114 and 116 are also formed.

Once formed, the calibration page is scanned and provided as an input to image analysis software. The actual locations of the objects relative to their anticipated locations are then calculated by the image analysis software so that corrections for future scan lines can be implemented by the EP device to remove any misalignments.

As another feature, FIG. 7 also shows fiducials in the form of crosses 150 that assist in providing a macro scale observation of the image on the calibration page, before any actually comparing of the objects or squares 112, 114, 116, etc., for micro scale misalignment occurs. In other words, the large fiducials in the scanned image first assist the image analysis software in understanding where small objects 112, 114 and 116 are relatively located to save processing time. More on this feature will be provided below.

Figure 9:
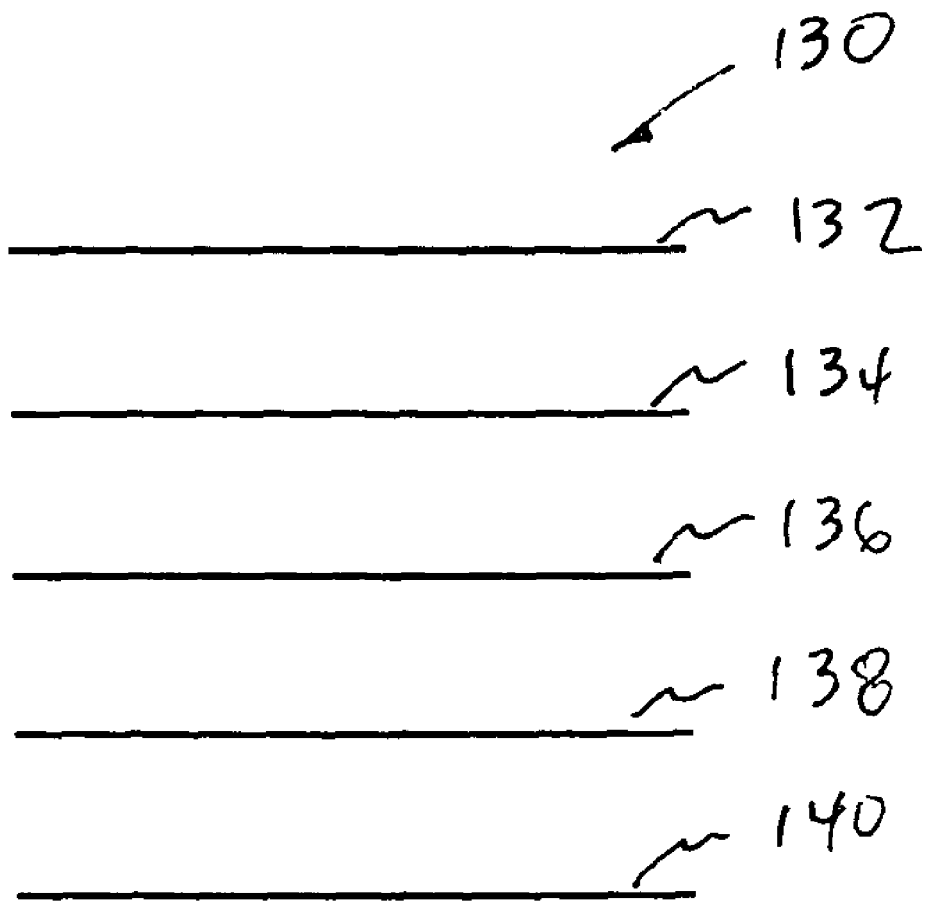
FIGS. 9 and 10 are diagrammatic views in accordance with the present invention of alternate embodiments of printed patterns.
Figure 10:
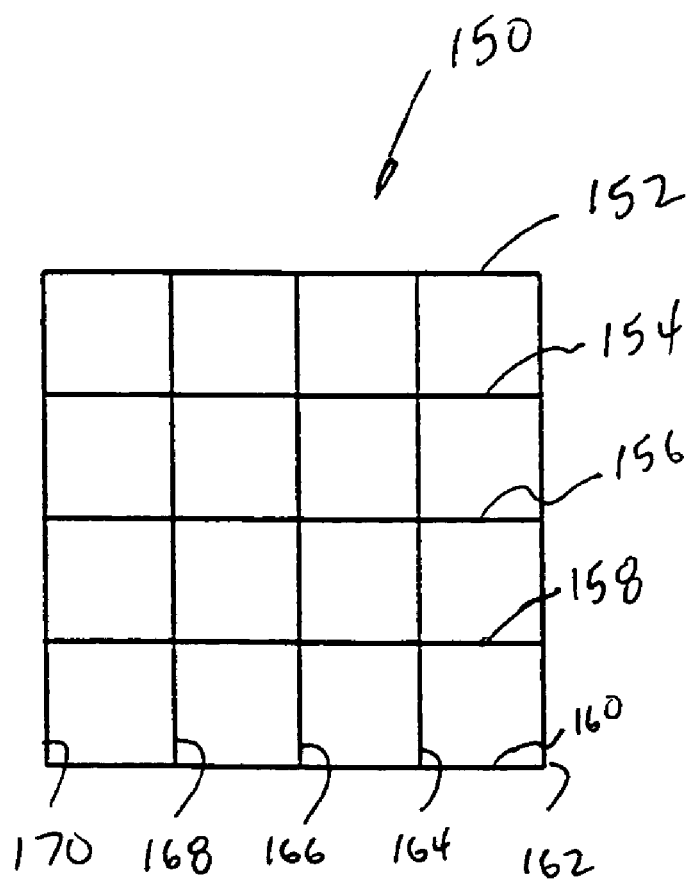
Figure 11:
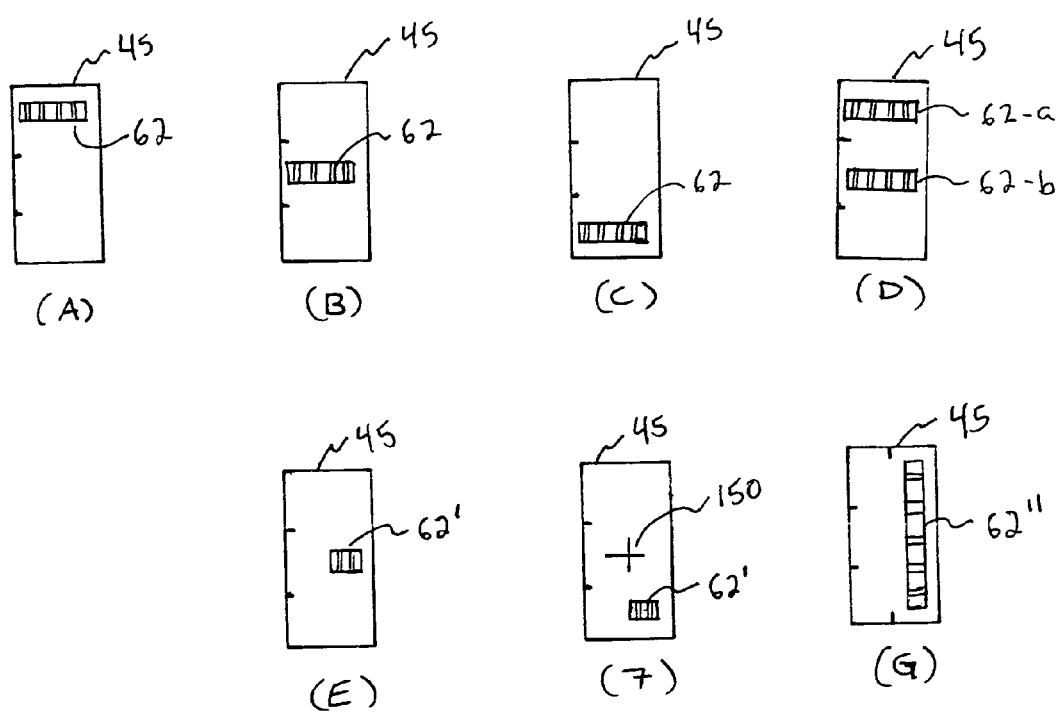
FIGS. 11A-11G are diagrammatic views in accordance with the present invention of alternate embodiments of placement of test images on a printed image output before scanning.

With reference to FIGS. 9 and 10, it is expected that infinitely many test images of calibration pages will be useful in determining calibration of an EP device. Thus, two more examples are representatively provided. In the first, a test image 130 includes a plurality of horizontal lines 132, 134, 136, 138, and 140. Processing would then likely occur in a manner orthogonal to the vertical line pairs of FIGS. 3-5. In the second, a test image 150 includes a grid of both horizontal lines 152, 154, 156, 158 and 160 and vertical lines 162, 164, 166, 168 and 170. Processing for this is then a hybrid, of sorts, between FIGS. 3-5 and FIG. 9. Naturally, other test images are possible, provided the objects or features thereof are formed with either forward or reverse scan lines, but not both.

With reference to FIGS. 11A-11G, many different versions of media 45 of calibration pages are presented. In this regard, skilled artisans are directed to appreciate that the test image itself may appear variously on the media. In A) the test image 62 appears in an upper one-third of the page as given by (one-third of the media) tick marks along the left hand edge of the media. In B), the test image 62 appears in a middle third while in C) it appears in a bottom third. Combining one or more of theses notions, D) shows the test image as appearing in more than one location on the media. Namely, test images 62-a and 62-b appear in the upper and middle thirds of the page. Alternatively still, E) shows a variously-sized test image 62' that represents less than a full size of test image 62 and such appears in a middle third of the page nearer a right-hand edge. In F) the variously sized test image 62' appears in a bottom third and is shown in existence with other items, such as a fiducial 150. In G) it is appreciated that the orientation itself of the test image may be altered to travel from top to bottom of the media as evidenced by test image 62". Of course, combinations of the foregoing are possible as are other embodiments. In FIG. 15, for example, an actual calibration page of an EP device consists of many of the foregoing notions. Namely, a first test image 62 is given above a second test image 120. A fiducial 150 also appears variously as do some horizontal bands 170 of varying darkness. By incorporation by reference, co-pending application having Ser. No. 11/506,424, filed on Aug. 18, 2006, entitled "Print Alignment for Bi-directionally Scanning Electrophotographic Device," having common assignee (Lexmark International, Inc.), is hereby referenced in its entirety for teaching the horizontal bands 170 and their functionality.

Figure 12:
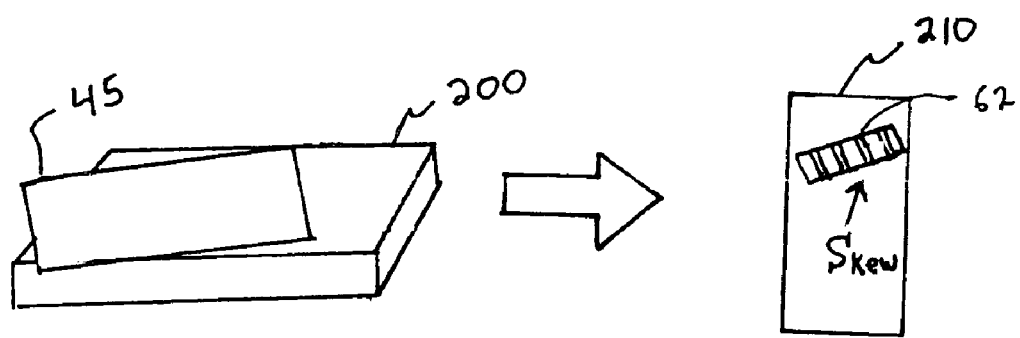
FIG. 12 is a diagrammatic view in accordance with the present invention of a representative scanned printed image.
Figure 13:
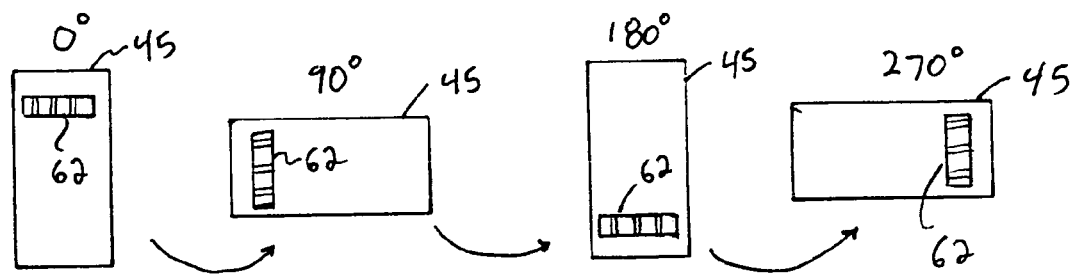
FIGS. 13 and 14 are diagrammatic views in accordance with the present invention of methods for characterizing misalignments of image acquisition devices for correcting a bi-directionally scanning EP device.
Figure 14:
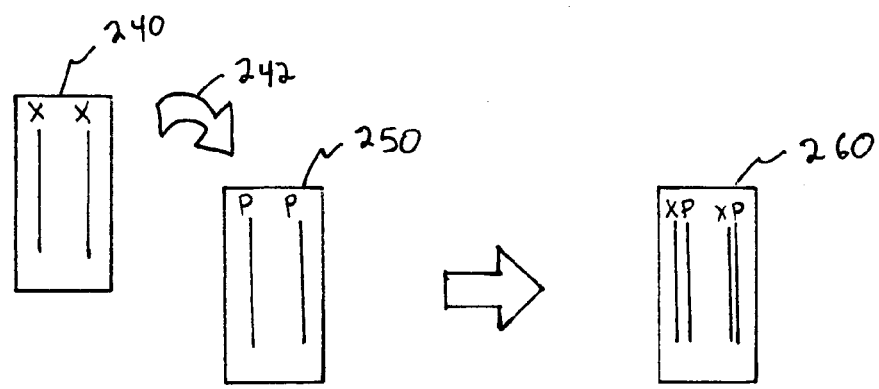

Appreciating that the calibration of the EP device is implicated by errors of image acquisition devices, such as flatbed or sheet-fed scanners or cameras, for example, reference is made to FIGS. 12-14. In this regard, FIG. 12 shows an operator may introduce a certain amount of skew into a scanned image 210 (eventually supplied as input to the image analysis software that determines the correction implemented by the EP device) by unintentionally skewing the media 45 of the calibration page on a flatbed scanner 200. Other errors, however, may also exist in the device itself, such as scaling, offset, contrast, nonlinearity, and brightness. As expected, each of these errors contributes to the ultimate error in locating features in a pattern of a calibration page, and thereby contributes to error in the final measurement of print nonlinearity and bi-directional misalignment. To disambiguate the description of errors, the remaining description refers to errors introduced by nonlinearity and bi-directional misalignment in the EP device as "print errors," while errors introduced during the process of acquiring an image with a scanner or other image acquisition device as "scan errors."

In turn, certain scan errors can be compensated if the test image 62 is properly designed to enable such compensation. For example, if measurements are all referenced to the location of a fiducial cross mark 150 (e.g., FIG. 15), scanner offset errors can be removed from the measurements. A horizontal line may also be included in the pattern so that the image-processing algorithm can deskew the image by rotating the image data such that the line becomes substantially horizontal.

On the other hand, certain print errors are relatively immune to confounding by scan errors. For example, bi-directional alignment error generally produces relatively small displacement between two printed pels located on adjacent scan lines. Since this measurement involves the difference in position between two closely located pixels, and scan errors such as nonlinearity are proportionately small in small local regions of an image, the relative contribution of the scan error to the overall measured pel displacement error is generally negligible for the purpose of determining an appropriate calibration factor for correction. Moreover, certain acquisition and image processing techniques can be employed to reduce the amount of scan error that propagates to the final measurement or to enable separation of scan errors from print errors.

For example, the vertical axis of the printed media 45 from the EP device might be aligned at 45° to the vertical axis of a scanner (FIG. 12) so that the effect of scan nonlinearity can be substantially removed from a print nonlinearity measurement. Since all vertical lines in the printed media will extend across the entire width of the scanner, averaging the measurement of horizontal print position for each vertical print line over its length will substantially reduce the error introduced by local scan nonlinearity.

As another example, a printed media 45 with a test image 62 from an EP device may be scanned in multiple orientations or positions (FIG. 13), such as θ=0°, 90°, 180° and 270° and x=0 mm and +10 mm relative to a standard reference orientation, where θ is the angular orientation of the media 45 relative to the scanner and x is the horizontal shift of the media relative to the scanner. The acquired image data of the scanner can then be analyzed and processed such that the effects of offset error or nonlinearity are removed. Alternatively, since scan errors are common to all such orientations, while the orientation of print errors follows the orientation of the sample, scan errors may be separated from the total measured error by finding the component of measured error common to all orientations. The scan error so determined may then be subtracted from the total error to determine print errors.

Another means of separating print error and scan error is to first scan a known reference sample or set of samples. The reference sample may be generated with substantially very small error in placement of features on the sample or may alternatively be generated with larger error in placement of features as long as it is then characterized using very accurate measurement techniques and equipment so that the locations of all features on the sample are known very accurately. The positions of the features measured from the scanned reference image from the EP device can then be compared to the known locations of the features to create a scan error map over the image acquisition field. In this manner, when printed media from the EP device is subsequently scanned and measured, the scan error at each position in the resulting image can be determined from the scan error map and subtracted from the total measured error at that position.

In FIG. 14, a further method of compensating for scan errors is to create a transparent reference template 240 with vertical lines X and X that can be overlaid 242 on and registered accurately to the printed media 250 (with vertical lines P and P at a known relatively small offset from where the EP device believes lines X and X are located) so that an acquired image 260 of the combined pair will contain features from both the reference template and the print alignment sample. As described above, features in the reference template are known relatively very accurately. In turn, subsequent processing of the acquired image may then locate features in the printed media relative to adjacent features from the reference template. For instance, lines X to P and lines X to P in combined image 260 may be compared with one another. Absolute position of a feature in the EP device may then be determined by adding the differential position (difference between X and P, for example) of the feature to the known absolute position of the adjacent feature in the reference template. Since the scan error for a measurement of differential position between two features is relatively very small, as described above, the scan error is thereby substantially removed from the measurement.

In still other embodiments, skilled artisans will appreciate that the foregoing described processes of calibrating an EP device to correct misalignment can be performed in an iterative fashion. For instance, it is contemplated that a first calibration page will be printed, such that a first correction will be implemented upon a first step of observing a first misalignment. From there, a second calibration page will be printed (including the first correction), such that a second correction will be implemented upon a second step of observing a second misalignment. From there, a third calibration page is printed (including the first and second correction), such that a third correction will be implemented upon a third step of observing a third misalignment, and so on until the best calibration of the EP device is implemented. Naturally, iterations can be fewer or more than that described and can zero-in on the best calibration in a variety of ways. Representatively, iterations can embody: an over, then under, then over again, etc. methodology with decreasingly smaller over- and undershoots; coarse, then fine, then finer, etc. methodology; a positive correction, a negative correction, a positive correction, etc., methodology; or other.

Finally, one of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of calibrating a bi-directionally scanning electrophotographic device, comprising:
   scanning a plurality of first scan lines of a latent image in a direction opposite a plurality of second scan lines of the latent image such that the first and second scan lines alternate with one another without overlapping each other; and
   creating a calibration test image from the first and second scan lines of the latent image, further including forming multiple objects of the test image with one of the objects being formed with pels located only on the first scan lines and another of the objects being formed with pels located only on the second scan lines.

2. The method of claim 1, further including printing the calibration test image.

3. The method of claim 1, further including observing the calibration test image for misalignments of the objects.

4. The method of claim 1, further including implementing a correction based on the calibration test image that alters future scanning of scan lines of latent images.

5. The method of claim 1, wherein the creating the calibration test image further includes forming a boundary and a plurality of line pairs in the boundary, each first and second line of the line pairs being the objects formed with either the first or second scan lines, but not both.

6. The method of claim 3, further including creating a fiducial on the calibration test image for macro scale alignment observing.

7. The method of claim 3, wherein the observing further includes visually selecting by a user, automated selecting or analysis after reading.

8. The method of claim 4, further including calibrating a device external to the EP device before the implementing the correction.

9. A bi-directionally scanning electrophotographic device, comprising:
   a photoconductor for being impinged with a plurality of first and second scan lines formed in alternating directions without overlapping each other to create a latent image; and
   a controller for producing the latent image on the photoconductor, wherein the controller defines a test image pattern with a plurality of objects and one of the objects is formed using the first scan lines such that pels of the one of the objects are located only on the first scan lines and another of the objects is formed using the second scan lines such that pels of the another of the objects are located only on the second scan lines.

10. The device of claim 9, wherein the controller includes an input regarding the calibration page.

11. The device of claim 10, wherein the controller includes a correction function for altering scanning of future scan lines of latent images.

12. The device of claim 9, wherein the one of the objects is a vertical line.

13. The device of claim 9, wherein the one of the objects is a square.

14. A method of calibrating a bi-directionally scanning electrophotographic device, comprising:
   performing multiple instances of scanning a plurality of first scan lines of a latent image in a direction opposite a plurality of second scan lines of the latent image in a manner such that the first and second scan lines alternate without overlap thereby creating a latent calibration test image having at least a plurality of objects, further including forming multiple objects of the latent calibration test image with one of the objects formed with pels located only on the first scan lines and another of the objects formed with pels located only on the second scan lines;
   printing a calibration page having the plurality of objects from the latent calibration page; and
   observing the plurality of objects to ascertain any misalignment of the objects.

15. The method of claim 14, further including implementing a correction based upon the observing.

16. The method of claim 15, further including calibrating a device external to the EP device before the observing.

* * * * *